(12) United States Patent
L' Hommedieu

(10) Patent No.: X6142
(45) Date of Patent: Oct. 1, 1830

(54) AUGER, SINGLE TWIST

(76) Inventor: Ezra L' Hommedieu

Ezra L'Hommedieu A Citiz of.
Letters Patent.

The Schedule referred to in these Letters Patent and making
Part of the same, containing a description in the words of the said
Ezra L' Hommedieu, himself of his improvement in the making
the Single Twist Auger.

To all to whom these presents shall come.
Be it known that I Ezra L. Hommedieu of Say Brook in the
County of Middlesex & State of Connecticut have invented a
new and useful improvement in the Operation of making the
Single twist Auger & in the Machinery for making the same &
that the following is a full and exact description of the same
as invented or improved by me, Viz; a rod or bar of iron or steel
of sufficient length & size for the shank & twist, for the auger desired
with a cap knob of steel on the end intended for the bit or lip
& worm of the auger is put between two rollers & by means of
a channel in one roller & a follower in the other is formed into
a triangular shape as far as is wanted for the twist. The
bit or lip & worm (if a worm is desired) are then shaped by
two dying with dies on opposite sides, a short turn is then
given to the rod near the lip or bit in a direction proper for
the commencement of the twist. The rod at the lip is then
interlocked upon the end of the Mould or spiral cylinder
hereafter described & then by giving the mould a rotatory pro-
gressive Motion while the rod is pressed into the cavity of
the Mould by an iron or other Metalic roller, placed beneath
the mould - The rod is thus wound in a spiral form to any
length desired - Oil or tallow is then spread on the work
with a brush or otherwise - The mould is then turned in a
reverse order - & the instrument is disengaged from the
mould mould – The shank is then put in the line of the twist & the
auger is ready to be finished in the ordinary mode by grinding
filing & polishing. The mould is a spiral cavity of the dimen-
sions proper for the auger to be made, passing round near the
end of a cylindrical bar of iron or other metalic substance
of from one to two inches in diameter, according to the size
of the auger to be made & from 2 to 3 feet in length supported
by two iron [illegible] or posts thro which the cylinder passes & a
spiral thread upon the cylinder, where it passes thro. one of
the posts fitting a spiral cavity in the interior of the post
[illegible] the progressive motion of the mould according to its
rotatory motion. The operation of making the twist by wind-
-ing & the Mould & Machinery applied for that purpose are what
I claim to have invented & for which a Patent is solicited.
The only mode of making this kind of augers previous to
my invention, being by swedging out the spiral turns
with dies from a round piece of iron in the form of a
bolt –

Exd. Witnesses Ezra L'Hommedieu
W.J.C. Ely Warren
Joshua L'Hommedieu